(12) United States Patent
Frey et al.

(10) Patent No.: US 9,013,777 B2
(45) Date of Patent: Apr. 21, 2015

(54) INTEGRATED DEVICE ARCHITECTURES FOR ELECTROCHROMIC DEVICES

(71) Applicant: ITN Energy Systems, Inc., Littleton, CO (US)

(72) Inventors: Jonathan Mack Frey, Denver, CO (US); Brian Spencer Berland, Morrison, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 3 days.

(21) Appl. No.: 13/758,468

(22) Filed: Feb. 4, 2013

(65) Prior Publication Data

US 2013/0201545 A1    Aug. 8, 2013

Related U.S. Application Data

(60) Provisional application No. 61/594,731, filed on Feb. 3, 2012.

(51) Int. Cl.
| | |
|---|---|
| *G02F 1/15* | (2006.01) |
| *G02F 1/153* | (2006.01) |
| *B32B 37/00* | (2006.01) |
| *G02F 1/155* | (2006.01) |
| *B32B 9/00* | (2006.01) |
| *H01R 3/00* | (2006.01) |

(52) U.S. Cl.
CPC ............. *G02F 1/1523* (2013.01); *G02F 1/15* (2013.01); *G02F 1/1525* (2013.01); *B32B 37/00* (2013.01); *B32B 9/00* (2013.01); *B32B 2307/00* (2013.01); *H01R 3/00* (2013.01); *G02F 1/155* (2013.01)

(58) Field of Classification Search
CPC ....... G02F 1/15; G02F 1/1523; G02F 1/1525; G02F 1/155; G02F 1/00; G02F 1/153; B32B 1/00; B32B 9/00; B32B 37/00; B32B 2307/00; H01R 3/00
USPC .............. 359/245, 265–275; 29/846; 428/704
See application file for complete search history.

(56) References Cited

U.S. PATENT DOCUMENTS

| | | | |
|---|---|---|---|
| 6,139,987 | A | 10/2000 | Koo et al. |
| 6,392,387 | B1 | 5/2002 | Sage et al. |
| 6,515,787 | B1 | 2/2003 | Westfall et al. |
| 6,753,108 | B1 | 6/2004 | Hampden-Smith et al. |
| 6,822,778 | B2 | 11/2004 | Westfall et al. |
| 6,856,444 | B2 | 2/2005 | Ingalls et al. |
| 6,967,183 | B2 | 11/2005 | Hampden-Smith et al. |
| 7,009,750 | B1 | 3/2006 | Westfall et al. |
| 7,087,341 | B2 | 8/2006 | Hampden-Smith et al. |
| 7,126,091 | B1 | 10/2006 | Westfall et al. |

(Continued)

OTHER PUBLICATIONS

U.S. Appl. No. 13/717,364, Notice of Allowance mailed Sep. 18, 2013, 9 pgs.

(Continued)

*Primary Examiner* — Loha Ben
(74) *Attorney, Agent, or Firm* — Merchant & Gould P.C.; George C. Lewis

(57) ABSTRACT

This disclosure describes systems and methods for creating monolithically integrated electrochromic devices which may be a flexible electrochromic device. Monolithic integration of thin film electrochromic devices may involve the electrical interconnection of multiple individual electrochromic devices through the creation of specific structures such as conductive pathway or insulating isolation trenches.

20 Claims, 17 Drawing Sheets

(56) References Cited

U.S. PATENT DOCUMENTS

| | | |
|---|---|---|
| 7,133,181 B2 | 11/2006 | Greer |
| 7,145,709 B1 | 12/2006 | Westfall et al. |
| 7,215,457 B1 | 5/2007 | Westfall et al. |
| 7,265,890 B1 | 9/2007 | Demiryont |
| 7,265,891 B1 | 9/2007 | Demiryont |
| 7,277,215 B2 | 10/2007 | Greer |
| 7,362,490 B2 * | 4/2008 | Park ............... 359/265 |
| 7,372,610 B2 | 5/2008 | Burdis et al. |
| 7,531,239 B2 | 5/2009 | Demiryont |
| 7,586,667 B2 | 9/2009 | Demiryont |
| 7,593,154 B2 | 9/2009 | Burdis et al. |
| 7,619,804 B1 | 11/2009 | Demiryont |
| 7,666,233 B2 | 2/2010 | Visco et al. |
| 7,704,555 B2 | 4/2010 | Demiryont |
| 7,830,585 B2 | 11/2010 | Widjaja et al. |
| 8,048,571 B2 | 11/2011 | Visco et al. |
| 8,202,649 B2 | 6/2012 | Visco et al. |
| 2003/0049517 A1 | 3/2003 | Hampden-Smith et al. |
| 2004/0067417 A1 | 4/2004 | Oosawa et al. |
| 2004/0185336 A1 | 9/2004 | Ito et al. |
| 2007/0012244 A1 | 1/2007 | Klaassen |
| 2007/0051620 A1 | 3/2007 | Visco et al. |
| 2009/0159582 A1 | 6/2009 | Chami et al. |
| 2010/0086851 A1 | 4/2010 | Wang et al. |
| 2010/0227214 A1 | 9/2010 | Krasnov et al. |
| 2011/0117417 A1 | 5/2011 | Pitts |
| 2013/0078535 A1 | 3/2013 | Aizawa |
| 2013/0101751 A1 | 4/2013 | Berland et al. |
| 2013/0154113 A1 | 6/2013 | Frey |
| 2013/0157152 A1 | 6/2013 | Lanning et al. |
| 2013/0171527 A1 | 7/2013 | Lanning et al. |
| 2013/0224590 A1 | 8/2013 | Divigalpitiya |
| 2014/0227609 A1 | 8/2014 | Frey et al. |

OTHER PUBLICATIONS

PCT International Search Report and Written Opinion in International Application PCT/US2012/056685, mailed Nov. 30, 2012, 8 pgs.

US Patent Application 13/731,554, Office Action mailed Aug. 1, 2014, 7 pgs. 23552 Patent Trademark Office.

Electric Power Research Institute, Development of Flexible Electrochromic Films, 1018525, Technical Update, Dec. 2009, EPRI Project Manager: K.R. Amarnath, 2009, 42 pgs.

U.S. Appl. No. 13/717,215, Office Action mailed Jan. 8, 2015, 17 pgs.

U.S. Appl. No. 13/731,554, Amendment and Response filed Oct. 24, 2014, 5 pgs.

U.S. Appl. No. 13/731,554, Notice of Allowance mailed Nov. 7, 2014, 7 pgs.

* cited by examiner

INTEGRATED DEVICE ARCHITECTURES FOR ELECTROCHROMIC DEVICES

GOVERNMENT LICENSE RIGHTS

This invention was made with government support under grant number DE-AR0000019 awarded by the Advanced Research Projects Agency, Department of Energy. The government has certain rights in the invention.

RELATED APPLICATION

This application claims priority to U.S. Provisional Patent Application No. 61/594,731, filed Feb. 3, 2012, which is incorporated herein in its entirety.

INTRODUCTION

Electrochromic devices are used in a variety of applications where it is desirous to control the opacity of an object. Applications include using an electrochromic device in conjunction with a window to create a "smart window." A solid-state electrochromic device has the advantage of being composed of solid materials, and therefore can operate in varied conditions such as any physical orientation and within a large temperature range. Through various fabrication techniques it is possible to make an electrochromic device composed of thin materials, some only nanometers or micrometers thick, to form an electrochromic device that may be millimeters thick, or smaller. These solid-state electrochromic devices are referred to as thin film electrochromic devices. Thin film electrochromic devices are often monolithically integrated, meaning they are manufactured by the patterned diffusion of elements into the surface of a thin substrate.

It is with respect to these and other considerations that embodiments have been made. Also, although relatively specific problems have been discussed, it should be understood that the embodiments should not be limited to solving the specific problems identified in the introduction.

Architectures for Electrochromic Devices

This disclosure describes systems and methods for creating monolithically integrated electrochromic devices which may be a flexible electrochromic device. Monolithic integration of thin film electrochromic devices may involve the electrical interconnection of multiple individual electrochromic devices through the creation of specific structures such as conductive pathway or insulating isolation trenches. As used herein, etching (i.e. chemical), drilling (i.e. mechanical), and scribing (i.e. laser) are considered interchangeable processes and are not to be taken as limiting.

In an embodiment of fabricating an electrochromic device, the method includes depositing a plurality of first electrochromic device layers on a first side of a substrate. The method also includes depositing a plurality of second electrochromic device layers on a second side of the substrate. Additionally, the method includes connecting a first one of the first electrochromic device layers with a first one of the second electrochromic device layers. The method also includes connecting a second one of the first electrochromic device layers with a second one of the second electrochromic device layers.

Another method of creating an electrochromic device includes, depositing a plurality of first electrochromic device layers on a first side of a substrate. Additionally the method includes depositing a plurality of second electrochromic device layers on a second side of the substrate. Also, the method includes connecting a first one of the first electrochromic device layers with a second one of the second electrochromic device layers.

An electrochromic device comprising, a substrate with at least a first side and a second side. Additionally, the embodiment includes a first ion-storage layer deposited on the first side of the substrate. In embodiments, the device also includes a first electrolyte deposited on the first ion-storage layer. Also, the device includes a first electrochromic layer deposited on the first electrolyte in embodiments. The device also includes a second ion-storage layer deposited on the second side of the substrate. The device also includes a second electrolyte deposited on the second ion-storage layer. The device may include a second electrochromic layer deposited on the second electrolyte, wherein at least one of the first ion-storage layer and the first electrochromic layer are in electrical contact with at least one of the second ion-storage layer and the second electrochromic layer.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

BRIEF DESCRIPTION OF THE DRAWINGS

Non-limiting and non-exhaustive embodiments are described with reference to the following figures.

DETAILED DESCRIPTION

Figure 1:
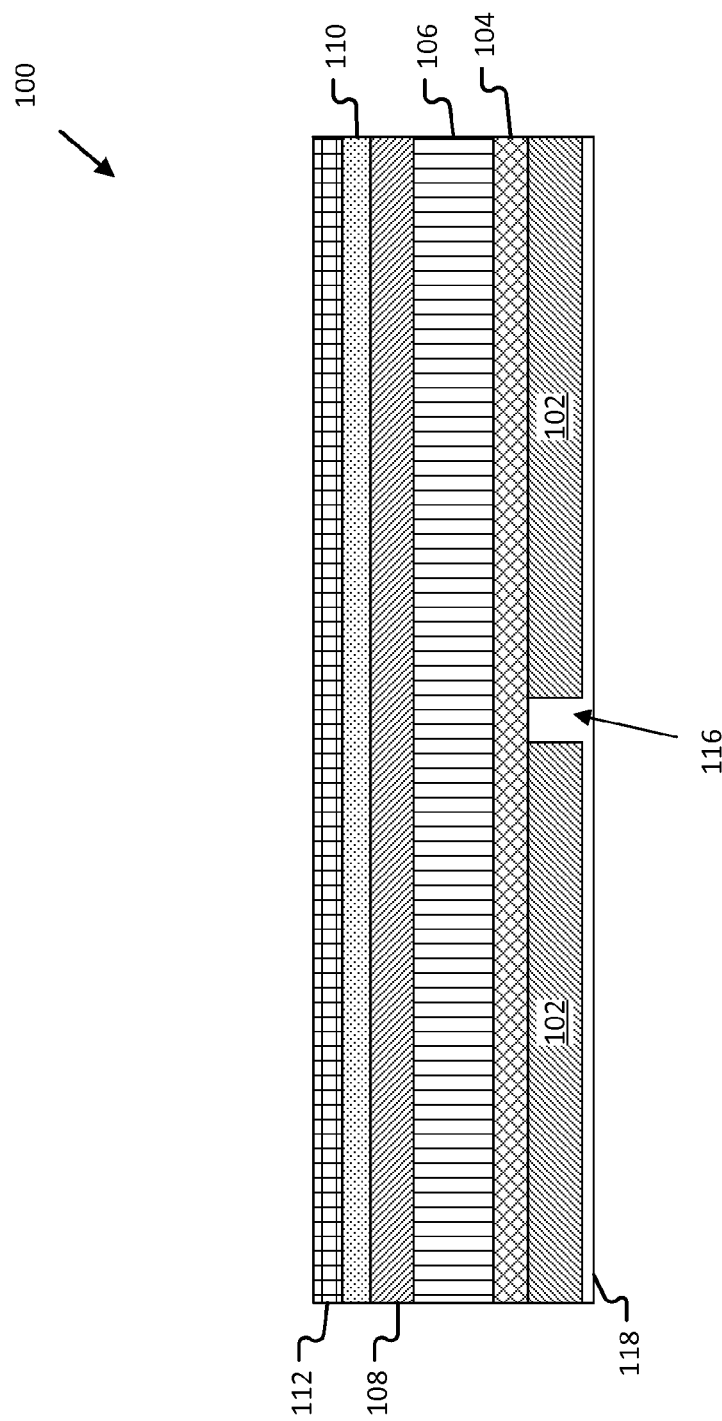
FIG. 1 illustrates an embodiment of a single-sided electrochromic device.

This application presents embodiments for thin film architectures of electrochromic devices. Various embodiments are described more fully below with reference to the accompanying drawings, which are a part of this application, and which show specific example embodiments. However, embodiments may be implemented in many different forms and should not be construed as limited to the embodiments set forth herein; rather, these embodiments are provided so that this disclosure will be thorough and complete in the presentation of the functional concepts, and will fully convey the scope of the embodiments to those skilled in the art. The following detailed description is, therefore, not to be taken in a limiting sense.

Electrochromic devices are devices that transition from one opacity state to another under the stimulus of an electrical voltage. A voltage may be applied to an electrochromic device to cause the electrochromic device to change its opacity state. For example, an electrochromic device may change from substantially transparent with respect to the visible light range to an opacity state that reflects or otherwise prevents blue light from passing through the device. Other opacity changes are possible and may be selected by the manufacturer to achieve desired performance criteria. An electrochromic device may become more or less reflective or opaque when voltage is applied.

Embodiments described in this application may refer to layers of an electrochromic device. For example, electrochromic devices may have a substrate layer, a cathode contact layer, an ion-storage layer, an electrolyte layer, an electrochromic layer, or an anode contact layer.

In embodiments, the substrate layer may be polyethylene terephtlate ("PET"). In other embodiments, the substrate is one of plastic, stainless foil, glass, and ceramic. Any other suitable material, now known or later developed may also be used.

The cathode-contact and the anode contact are generally a transparent conductive oxide ("TCO"). This includes indium tin oxide. Any other suitable material, now known or later developed may also be used.

The ion-storage layer may be a variety of materials, but is often a metal oxide. This includes any number of lithiated metal oxides including lithium nickel oxide, lithiated mixed metal oxides (such as lithium nickel tungsten oxide where the W:Ni ratio is less than 1:1). Any other suitable material, now known or later developed may also be used. Furthermore, the ion-storage layer and/or electrochromic electrode can be deposited as a metal oxide using a method such as reactive sputtering, and lithiated in a separate step, such as a physical vapor deposition of lithium.

The electrolyte may be an insulating polymer fill, or it may be an electrolyte with sufficiently high resistance. The electrolyte (El) is deposited over the IS and TCO layers. Any suitable electrolyte, now known or later developed may be used. Polymer electrolytes, polyelectrolytes, and solid inorganic electrolytes may be used. For example, polypropylene glycol) with salts such as $LiClO_4$, $CF_3SO_2H$ or $H_3PO_4$ dissolved in them may be used.

The electrochromic layer may be a mixed metal oxide (such as molybdenum tungsten oxide where the Mo:W ratio is less than 1:1). In an embodiment, Tungsten Oxide ($WO_x$) is used as the EC layer, though other suitable materials may be used.

There exist a variety of means, both vacuum and nonvacuum, to deposit each of the materials, such as but not limited to physical vapor deposition, chemical vapor deposition, thermal evaporation, pulsed laser deposition, sputter deposition, and sol-gel processes.

One embodiment of a single-sided electrochromic device is illustrated in FIG. 1. In some embodiments, the electrochromic device 100 is deposited in layers on a substrate 102. To contact the cathode contact layer 104, a via 116 is drilled or etched through the substrate 102 and a conductive layer 118 is deposited on the side of the substrate 102 opposite the electrochromic device. In another embodiment, a substrate 102 is used with a conductive layer 118 already present on one side, and vias 116 are etched or drilled through the substrate 102 but not through the conductive layer 118. The vias 116 can then be filled with a conductive paste or with the cathode contact 104 to establish contact with the conductive layer 118. The via 116 may be drilled or etched in any suitable manner such as but not limited to by laser. By contacting the ion-storage layer 106 through a laser-drilled via 116 the fabrication may be made easier. Also, when contacting the ion-storage layer 106 through a laser-drilled via, an electrochromic device can be fabricated and then post processed to form many smaller functional electrochromic device. It should be noted the cathode contact 104, which is connected to and contacted by the conductive layer 118, and the anode contact 112 are located on opposite sides of the substrate 102 in this embodiment. In an embodiment, substrate 102, cathode contact 104, ion-storage layer 106, electrolyte 108, electrochromic layer 110, and/or anode contact 112, are the same as or similar to previously described substrate.

Figure 2:
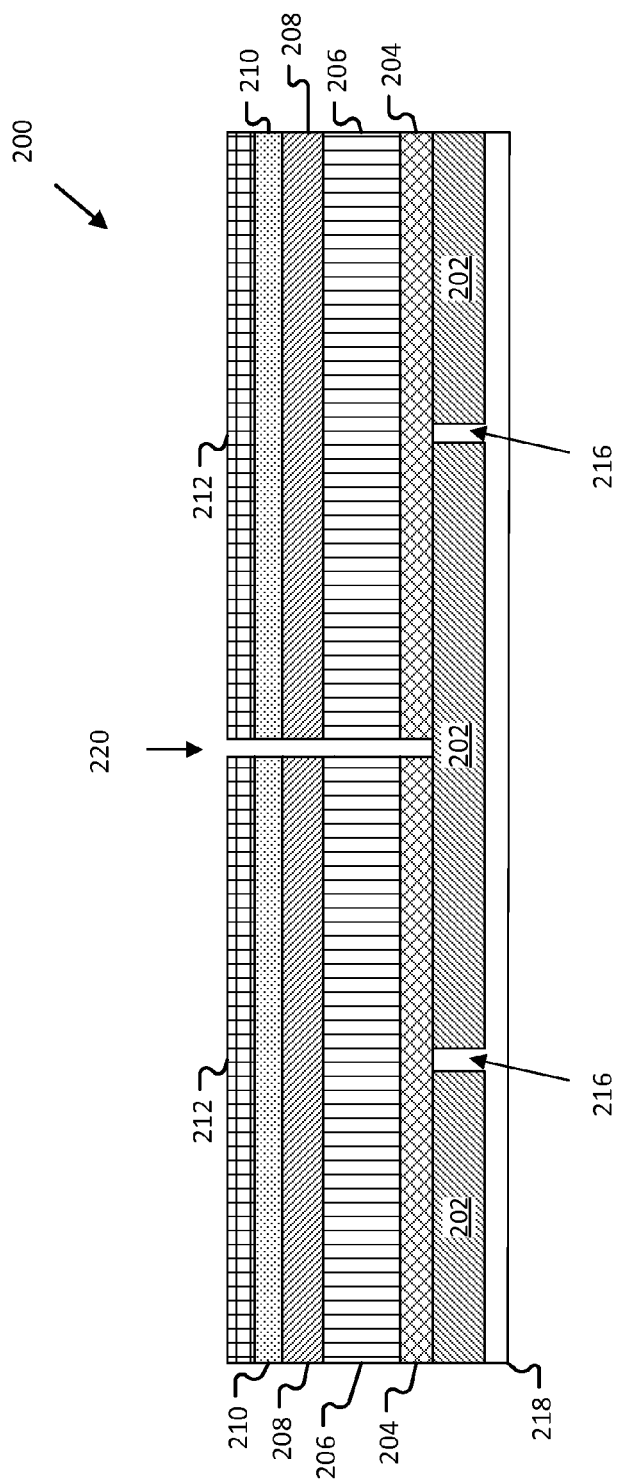
FIG. 2 illustrates an embodiment of a single-sided, multiple electrochromic device structure configured with a common cathode.

One embodiment of a single-sided, multiple electrochromic device 200 configured with a common cathode is illustrated in FIG. 2. As illustrated, it is possible for multiple electrochromic devices to be fabricated on a substrate 202 and then connected by a common conductive layer 218 connected to the cathode contact 204 of each electrochromic device by cutting etches or drilling vias 216 through the substrate 202 to contact each cathode 204, and then depositing a conductive layer 218 on the substrate 202 opposite the electrochromic device. In another embodiment, a large electrochromic device could be fabricated and then etched or drilled 220 to isolate the electrochromic layer 210 and anode contacts 212 of each electrochromic device. It should be noted that in this embodiment the conductive layer 218 connected to the one ion-storage layer 206 is on the opposite side of the substrate 202 from the plurality of electrochromic devices 210. In an embodiment, non-conductive substrate 202, cathode contact 204, ion-storage layer 206, electrolyte 208, electrochromic layer 210, anode contact 212, via 216, and/or conductive layer 218, are the same as or similar to previously described.

Figure 3:
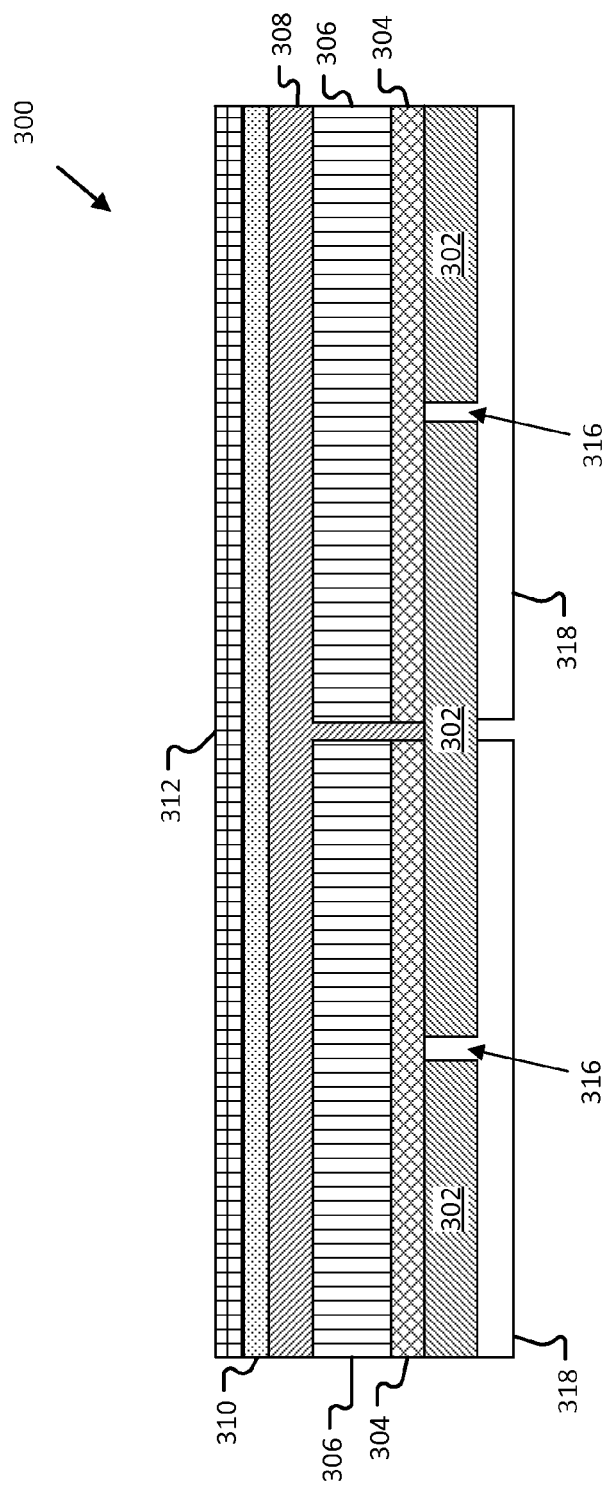
FIG. 3 illustrates an embodiment of a single-sided, multiple electrochromic device structure configured with a common electrochromic device.

An embodiment of a single-sided, multiple electrochromic device structure 300 configured with an electrochromic device is illustrated in FIG. 3. As illustrated, a common electrochromic layer 310 is possible by separating the ion-storage layer 306 and cathode contact 304 of different electrochromic devices from each other by depositing an electrolyte 308 between them. In one embodiment, as illustrated, contact is established with the cathode contacts 304 by laser-drilling vias 316 (or etches) through the substrate 302 and depositing a conductive material 318 on the opposite side of the substrate 302 as the electrochromic layer. In the embodiment shown, the conductive material 318 is deposited on an area local to the via 316, and does not overlap with the conductive material 318 deposited around other vias 316. This conductive material 318 deposition forms separate contact points for each of the electrochromic layers 304. Further, the electrolyte 308 is deposited as a layer across the entire structure and between the ion-storage layer 306 and cathode contacts 304. The electrochromic layer 310 and anode contact 312 are deposited as a layer across the top of the entire structure. The depositing of the electrochromic layer 310 and anode contact 312 creates a common electrochromic layer 310 and anode contact 312 across the structure 300. It should be noted that the contact for the plurality of ion-storage layers 306 is made with a conductive layer 318 on the opposite side of the substrate 302 from the contact 312 for the electrochromic layer 310. In an embodiment, substrate 302, cathode contact 304, cathode 306, electrolyte 308, electrochromic layer 310 and/or anode contact 312 are the same as or similar to previously described.

Figure 4:
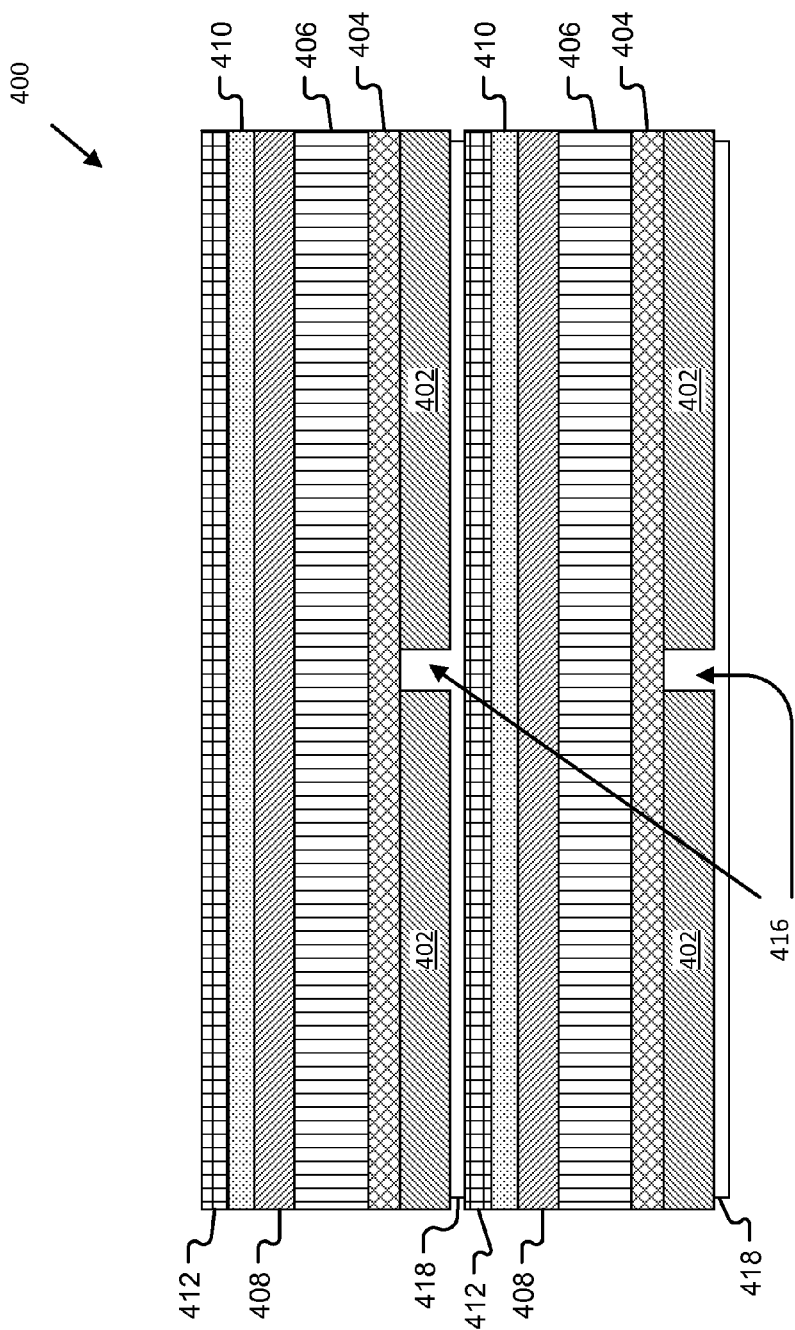
FIG. 4 illustrates an embodiment of a stack-configured, single-sided electrochromic device connected in series.

An embodiment of a stack-configured, electrochromic device connected in series 400 is illustrated in FIG. 4. In one embodiment, at least two electrochromic devices similar to those in FIG. 3 are fabricated with laser drilled vias 416 on the back side of the substrate 402. In some embodiments, series contact is made between the electrochromic devices by physically stacking the electrochromic devices on top of one another so the conductive region 418 is in contact with the anode contact layer 412 of another electrochromic device.

In one embodiment a single substrate 402 is used and electrochromic devices are deposited on top of one another, where the cathode contact 404 and/or ion-storage layer 706 of one electrochromic device is deposited directly on top of the anode contact 412 and/or electrochromic layer 410 of the electrochromic device that was previously deposited. In another embodiment an initial substrate 402 is one in which another electrochromic device has been deposited. Another electrochromic device is deposited on top of the first by replacing the secondary substrate, and cathode contact with a conductive metal foil. In an embodiment, substrate 402, cathode contact 404, ion-storage layer 406, electrolyte 408, electrochromic layer 410, and/or anode contact 412 are the same as or similar to previously described.

Figure 5:
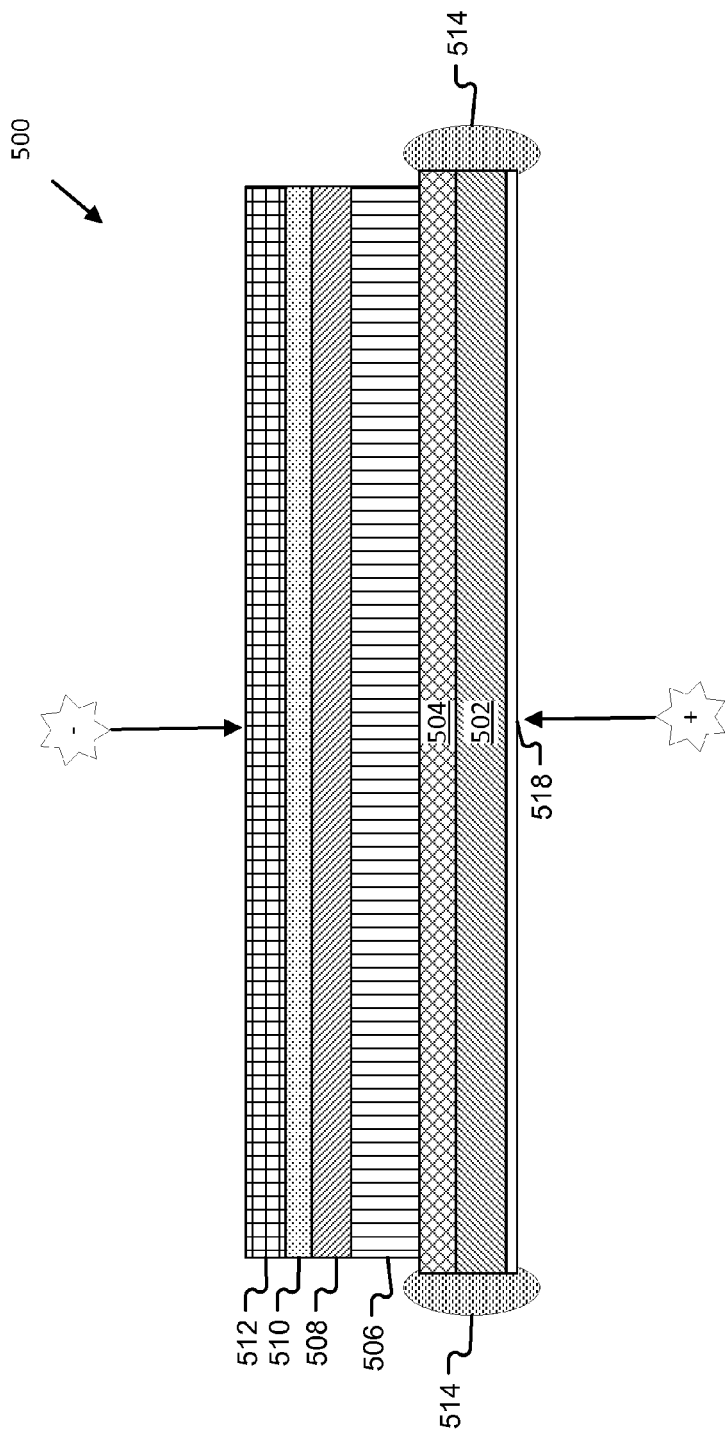
FIG. 5 illustrates an embodiment of a single-sided electrochromic device.

One embodiment of a single-sided electrochromic device 500 is illustrated in FIG. 5. In this embodiment the various layers of the structure 500 are deposited uniformly across the substrate 502. Also, a conductive layer 518 is deposited on the side of the substrate 502 electrochromic device. In the embodiment shown, contact is made between the conductive layer 518 deposited on the back side of the substrate 502 and the ion-storage layer 506 and/or cathode contact 504 by soldering 514 them together around the edge of the substrate 502. It should be noted that in this embodiment, contact with the ion-storage layer 506 and/or cathode contact 504 and the electrochromic layer 510 and/or anode contact 512 can be made on the same and/or opposite sides of the substrate 802. In an embodiment, substrate 502, cathode contact 504, ion-storage layer 506, electrolyte 508, electrochromic device 510, and/or anode contact 512 are the same as or similar to previously described above.

Figure 6:
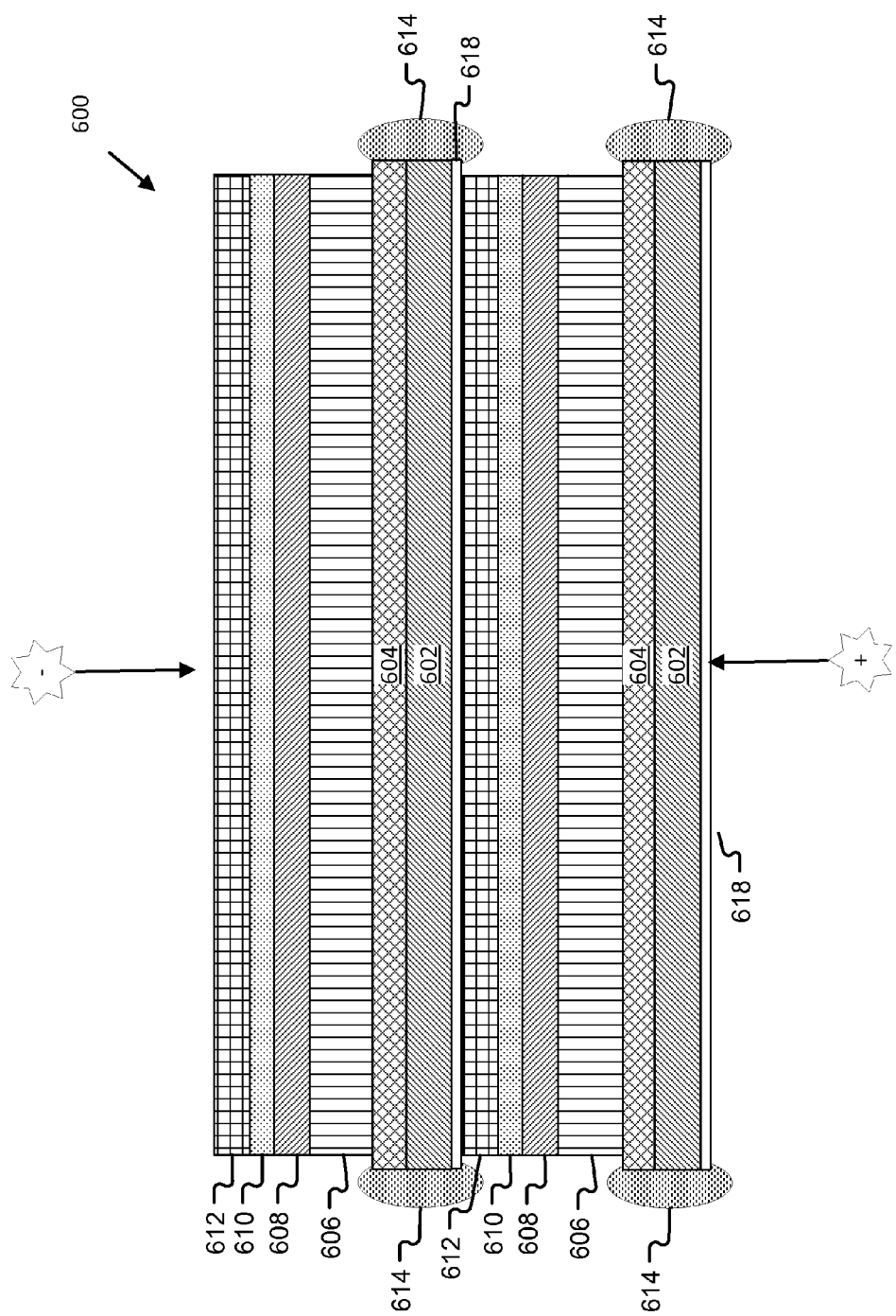
FIG. 6 illustrates an embodiment of a stack-configured, single-sided electrochromic device.

One embodiment of a stack-configured, single-sided electrochromic device 600 is illustrated in FIG. 6. In this embodiment, a conductive layer 618 is deposited on the back side of the substrate 602, and contact is established with the ion-storage layer 606 and/or cathode contact 604 through soldering 614 around the edge of the substrate 602. In this embodiment, two electrochromic devices, such as those illustrated in FIG. 6 are connected in series by stacking the conductive layer 618 in contact with the ion-storage layer 606 and/or cathode contact 604 of one electrochromic device on the anode contact 612 of another electrochromic device. In an embodiment, substrate 602, cathode contact 604, ion-storage layer 606, electrolyte 608, electrochromic layer 610, and/or anode contact 612 are the same as or similar to previously described above.

Figure 7:
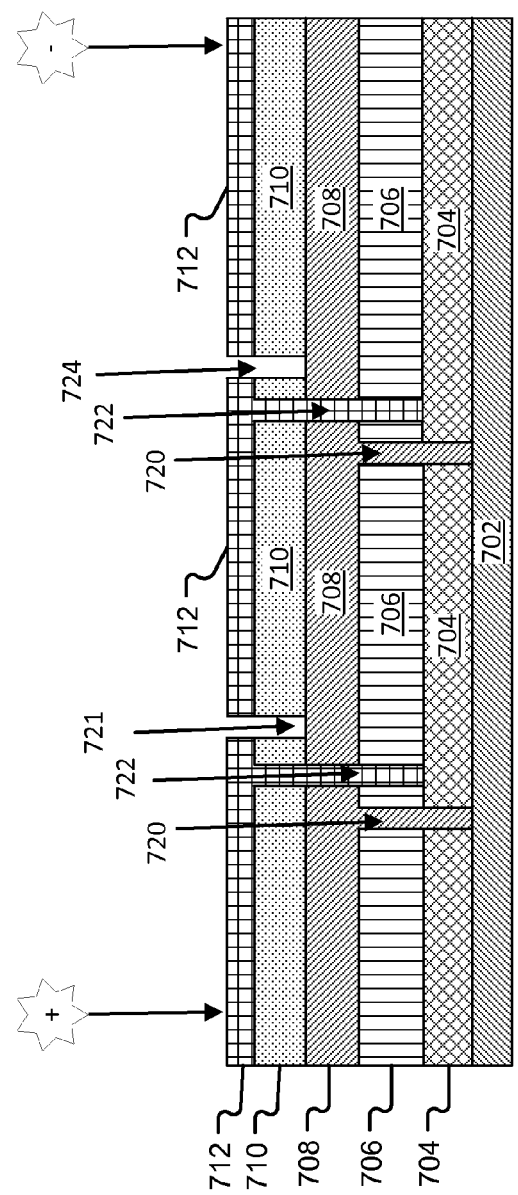
FIG. 7 illustrates an embodiment of a single-sided, series connected, monolithically integrated electrochromic device.

An embodiment of a single-sided, series connected, monolithically integrated electrochromic device 700 is illustrated in FIG. 7. In this embodiment uniform layers are deposited across a substrate 702. Between deposition layers, structures 720, 722, and 724 are etched into the previous layers to establish the architecture of the electrochromic device 700.

In some embodiments, standard P1/P2/P3 etching is used to establish isolation between a first ion-storage layer 706 and a second ion-storage layer 706, between a first electrolyte 708 and a second electrolyte 708, and between a first electrochromic layer 710 and a second electrochromic layer 710. Also the etching is used to establish a connection between the electrochromic layer 710 of one electrochromic device and the ion-storage layer 706 of the next electrochromic device in series.

As illustrated in this embodiment, the first etch (P1) 720 on the left side may occur after the cathode contact 704 and ion-storage layer 706 have been deposited on the substrate 702. The P1 etch 720 may be created while leaving the substrate 702 relatively unaffected. The P1 etch 720 may be filled with the electrolyte when the electrolyte layer 708 is deposited. The P1 etch 720 isolates a first ion-storage layer 706 and/or a first cathode contact 704 of one electrochromic device from a second ion-storage device 706 and/or a second cathode contact 704 of another electrochromic device.

Continuing to the right in the illustration, the second etch (P2) 722 occurs after the electrolyte layer 708 and the electrochromic layer 710 have been deposited. The P2 etch 722 serves to further isolate a first ion-storage layer 706 of one electrochromic device from a second ion-storage layer 706 of another electrochromic device. Further, the P2 etch 722 allows a first anode contact 712, after it has been deposited, to contact a second cathode contact 704 of the next electrochromic device in series. Additionally, the P1 etch 720 may prevent the ion-storage layer 706 and/or cathode contact 704 from contacting the P2 etch 722 after the anode contact 712 is deposited. The third etch (P3) 724 may be performed after all of the layers have been deposited, and it etches the anode contact 712 layer as well as the electrochromic layer 710. This isolates the electrochromic layers 710 of each of the electrochromic devices.

The result of this P1/P2/P3 (720/722/724) etching process is multiple electrochromic devices deposited on the same substrate 702 at the same time that are all connected to one another in series. In this embodiment, the first cathode contact 704, first ion-storage layer 706, and first electrolyte 708 on the left end of the structure 700 before the P1 etch 720 occurs do not actually form an electrochromic device because there is no contact point for the first ion-storage device 706. Because there is no contact point for the first ion-storage device 706 on the left end of the structure 700, the first anode contact 712 on the left edge of the structure 700 serves as the point of contact for a second cathode contact 704 because the second cathode contact 704 is the only thing in electrical contact with the first anode contact 712. It should be noted that in this embodiment the contact point for the cathode contact 704, or the first anode contact 712, and the third anode contact 712 are contacted on the same side of the substrate 702. In an embodiment, substrate 702, cathode contact 704, ion-storage layer 706, electrolyte 708, electrochromic layer 710, and/or anode contact 712 are the same as or similar to previously described above.

In another embodiment (not shown), vias are drilled through the back side of the substrate and a conductive material is deposited thereon. The conductive material can then be used as a point of contact for the ion-storage layer, assuming the vias are drilled through the substrate to the cathode contact, similar to the via 116 illustrated in FIG. 1. In this embodiment, the ion-storage layer, cathode contact, and electrolyte on the edge of the structure would be actively used in the electrochromic device because the cathode contact would be used as a contact point. Furthermore contact for the ion-storage layer and contact for the electrochromic device occur on opposite sides of the substrate.

Figure 8:
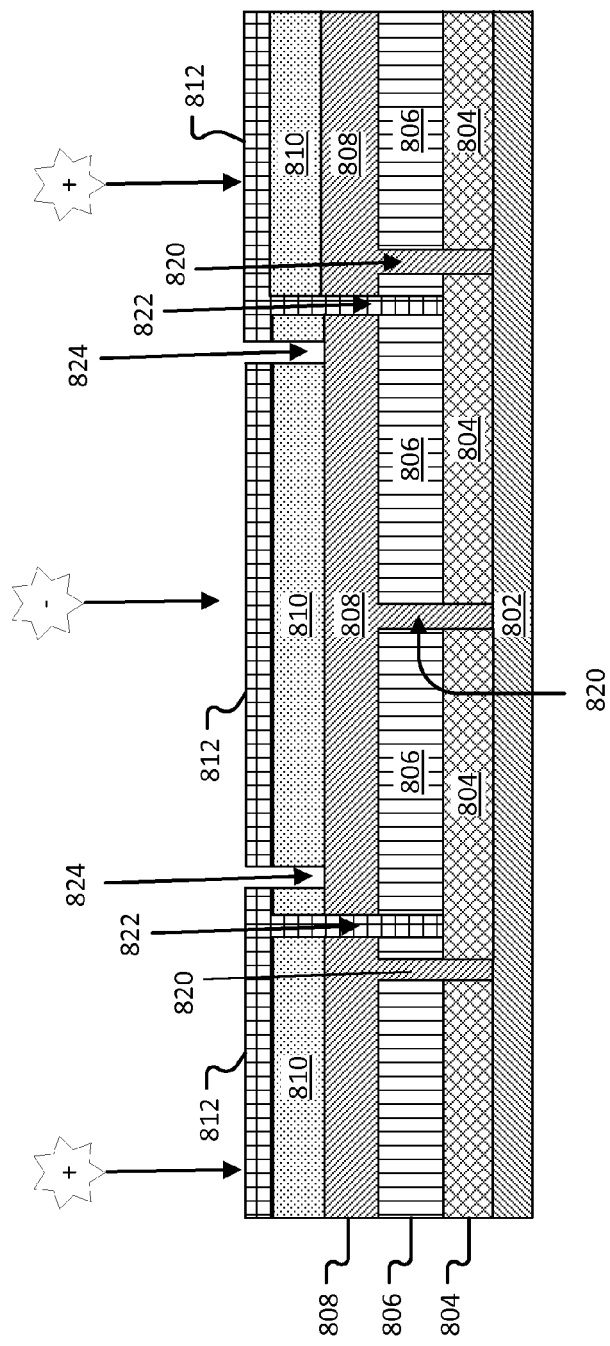
FIG. 8 illustrates an embodiment of a single-sided, parallel connected, monolithically integrated electrochromic device.

An embodiment of a single-sided, parallel connected, monolithically integrated electrochromic device 800 is illustrated in FIG. 8. Similar P1/P2/P3 (820/822/824) etches are used as in FIG. 7 with an additional P1 etch 820 included. This additional P1 etch 820 without the P2 822 and P3 824 etches creates electrochromic devices that are connected in parallel. Further, on the opposite side of the additional P1 etch 820 from the original P1/P2/P3 etches 820/822/824, the order is reversed and P3/P2/P1 etches 824/822/820 are utilized. In this embodiment, the cathode contact 804, ion-storage layer 806, and electrolyte 808 on both edges of the structure 800 are not involved in an electrochromic device because there is no contact point for the cathode 806. In another embodiment, two or more sets of series connected electrochromic devices similar to the one seen in FIG. 7 can be connected in parallel in a manner similar to that seen in FIG. 8. It should be noted that this embodiment contains triple point contacting, all of which are located on the same side of the substrate. There is a different positive contact for each of the parallel branches, and one negative contact that is responsible for both of the parallel branches. In another embodiment (not shown), vias are drilled through the back side of the substrate and a conductive material is deposited thereon. The conductive material can then be used as a point of contact for the ion-storage layers, assuming the vias are drilled through the substrate to the cathode contact, similar to the via 116 illustrated in FIG. 1. In this embodiment, the cathode contact, ion-storage layer, and electrolyte on both edges of the structure can be utilized in the electrochromic device since the cathode contact can be contacted. Furthermore contact for the ion-storage layer and contact for the electrochromic device occur on opposite sides of the substrate. In an embodiment, substrate 802, cathode contact 804, ion-storage layer 806, electrolyte 808, electrochromic layer 810, anode contact 812, P1 etch 820, P2 etch 822, and/or P3 etch 824, are the same as or similar to previously described substrate above.

Figure 9:
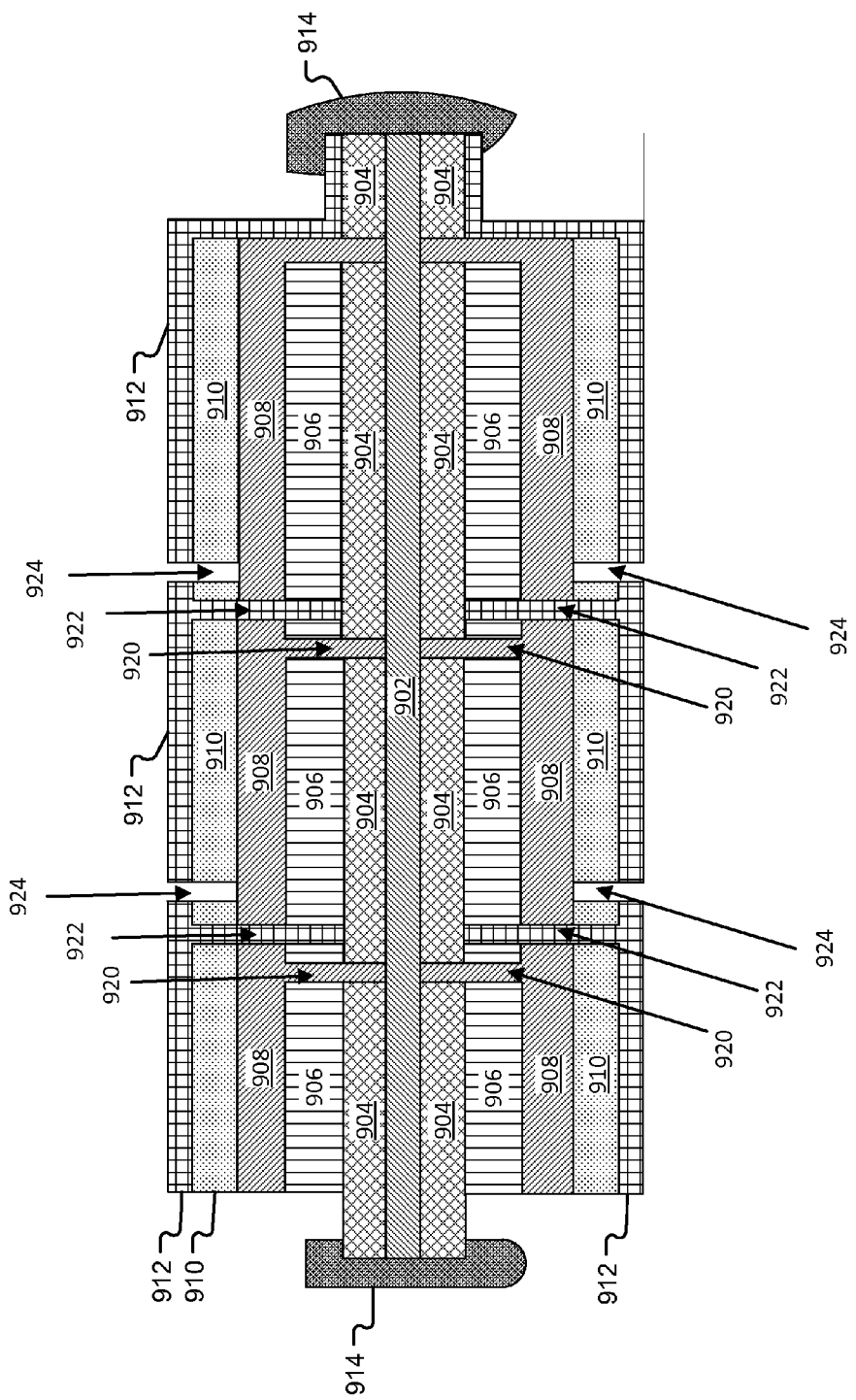
FIG. 9 illustrates an embodiment of a double-sided, series and parallel connected, monolithically integrated electrochromic device.

One embodiment of a double-sided, series and parallel connected, monolithically integrated electrochromic device 900 is illustrated in FIG. 9. In this embodiment a series connected, monolithically integrated, electrochromic device is fabricated similar to the embodiment illustrated in FIG. 7, but is fabricated on both sides of the substrate 902. It should be noted that in this embodiment the series connected electrochromic devices fabricated on the back side of the substrate 902 mirrors the electrochromic device fabricated on the front side. In some embodiments, both sides are patterned simultaneously. In one embodiment, the series connected electrochromic devices on either side of the substrate 902 are connected in parallel by soldering 914 together the cathode contacts 904 on one end, and the anode contacts 912 on the other. In another embodiment vias are etched or drilled through the substrate 902 and then filled with a conductive paste or the deposited cathode contact 904 to connect the cathode contacts 904 on one end of the structure, and the anode contacts 912 on the other end. In this embodiment the two contact points can be on the same side of the substrate 902 or on opposite sides of the substrate 902, and either or both contacts can also be on the edge of the structure 900. In an embodiment, substrate 902, cathode contact 904, ion-storage layer 906, electrolyte 908, electrochromic device 910, anode contact 912, P1 etch 920, P2 etch 922, and/or P3 etch 924, are the same as or similar to previously described above.

Figure 10:
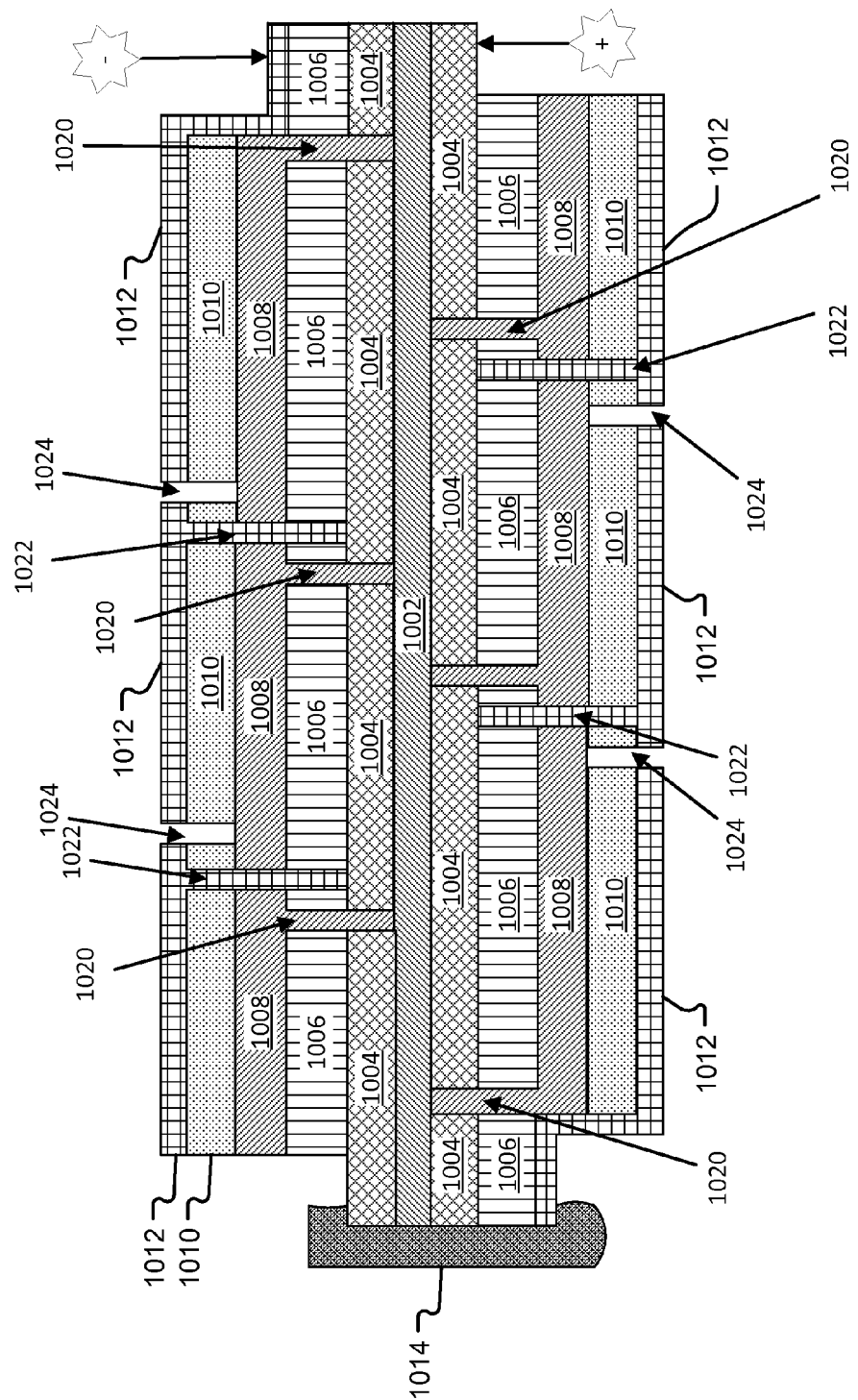
FIG. 10 illustrates an embodiment of a double-sided, series connected, monolithically integrated electrochromic device.

One embodiment of a double-sided, series connected, monolithically integrated electrochromic device 1000 is illustrated in FIG. 10. In this embodiment a series connected monolithically integrated SSLB, similar to the embodiment illustrated in FIG. 10, is deposited on both sides of the substrate 1002. Unlike the embodiment illustrated in FIG. 9, in this embodiment the electrochromic device on each side of the substrate 1002 do not mirror each other, so the cathode contact 1004 of the electrochromic device on one side of the substrate 1002 is located across the substrate 1002 from the anode contact 1012 of the electrochromic device on the other side. In this embodiment the cathode contact 1004 and anode contact 1012 are soldered 1014 together on one end of the structure 1000, around the edge of the substrate 1002. This soldering 1014 forms a series connection of the two series connected electrochromic device on each side of the substrate 1002. It should be noted that the end of the structure 1000 opposite the soldering 1014 is not soldered and serves as the points of contact. In some embodiments, a via (not shown) is etched or drilled through the substrate 1002 on the end opposite the points of contact and then filled with a conductive paste or the deposited cathode contact 1004 to connect a cathode contact 1004 of the electrochromic devices on one side of the substrate 1002 with an anode contact 1012 of the electrochromic devices on the opposite side of the substrate 1002. In the illustrated embodiment the point of contact is on the same edge of the structure 1000, but on opposite sides of the substrate 1002. In an embodiment, substrate 1002, cathode contact 1004, ion-storage layer 1006, electrolyte 1008, electrochromic layer 1010, anode contact 1012, P1 etch 1020, P2 etch 1022, and/or P3 etch 1304, are the same as or similar to previously described above.

Figure 11:
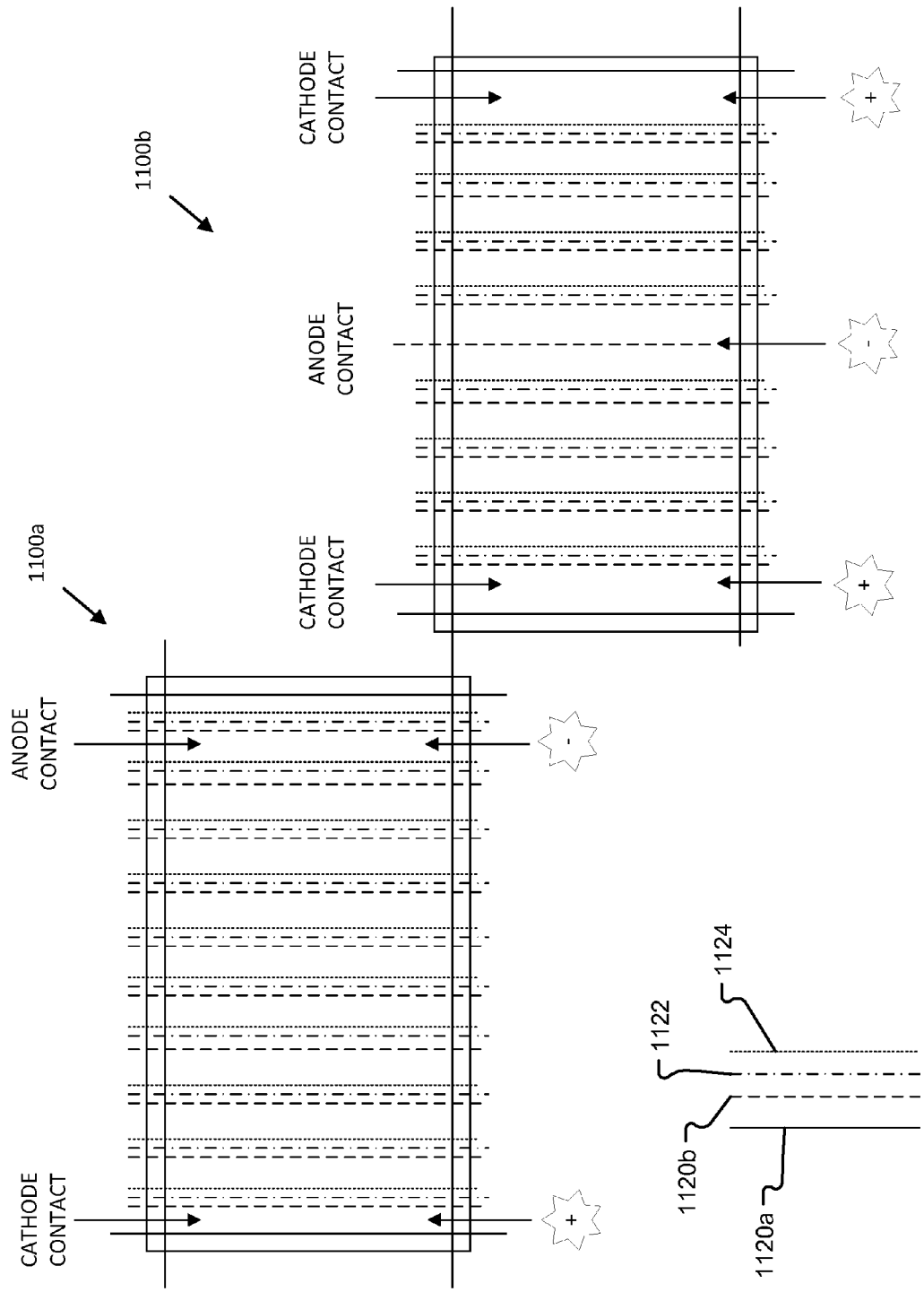
FIG. 11 illustrates an embodiment of a method of roll-to-roll manufacture of a single-sided, series connected or parallel connected, monolithically integrated electrochromic device.

An embodiment of a method of roll-to-roll manufacture of a single-sided, series connected or parallel connected, monolithically integrated electrochromic device 1100 is illustrated in FIG. 11. The top view of an embodiment of a single-sided, series connected, monolithically integrated electrochromic device 1100a similar to the embodiment shown in FIG. 7 is shown to the left of the illustration. The top view of an embodiment of a single-sided, parallel connected, monolithically integrated electrochromic device 1100b similar to the embodiment shown in FIG. 8 is shown to the right of the illustration. Included in this illustration are isolation etches 1120a as well as the P1 1120b, P2 1122, and P3 1124 etches. It should be noted that the isolation etch 1120a is similar to, and in some cases the same as, the P1 etch 1120b. In an embodiment, the isolation etch 1120a differs from the P1 etch 1120b in that the isolation etch 1120a occurs after all of the active layers have been deposited on the substrate thereby isolating all of the layers. Also illustrated are positive and negative contact points for each of the electrochromic device architectures 1100a, 1100b. In one embodiment, laser scribing is used to etch the isolation etches 1120a and/or the P1/P2/P3 etches 1120b/1422/1424. In this embodiment a very high throughput can be achieved for a roll-to-roll process, in part due to the varied conditions under which a laser can operate compared to an alternate etching process. In an embodiment, roll-to-roll processing can be performed on one or two sides of the substrate, resulting in a single-sided or double-sided electrochromic device. The two sides of a double-sided electrochromic device can be deposited and/or etched in the same roll-to-roll process or in separate processes. It should be noted that the number of cells as well as the electrical configuration (series or parallel connection) can be modified to meet specific voltage and/or current guidelines. In an embodiment, P1 etch 1120, P2 etch 1122, and/or P3 etch 1124, are the same as or similar to previously described P1 etch 720, P2 etch 722, and/or P3 etch 724, respectively.

Figure 12:
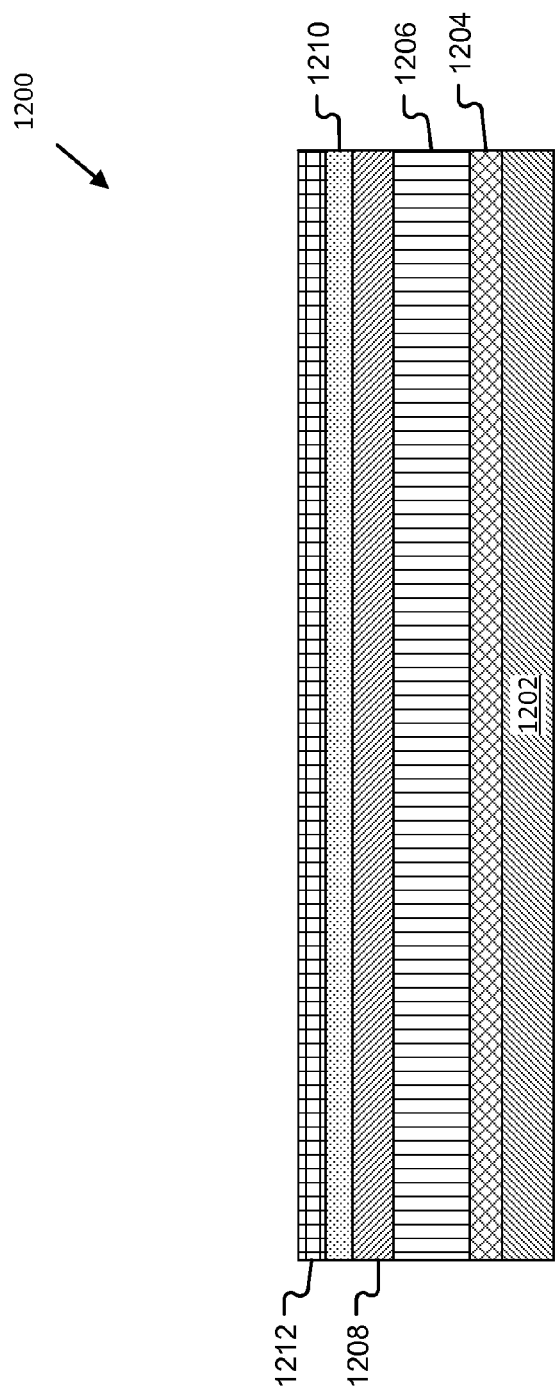
FIG. 12 illustrates an embodiment of a first step of a method for fabricating electrochromic device.

FIG. 12 illustrates an embodiment of a first step of a method for fabricating electrochromic device 1200. In this embodiment the first step is to uniformly deposit the active electrochromic device layers, such as but not limited to the ion-storage level 1206, electrolyte 1208, and electrochromic layers 1210 deposited on a substrate 1202. In an embodiment, the layers include a cathode contact 1204 and an anode contact 1212. In an embodiment, substrate 1202, cathode contact 1204, ion-storage layer 1206, electrolyte 1208, electrochromic layer 1210, and/or anode contact 1212, are the same as or similar to previously described above.

Figure 13:
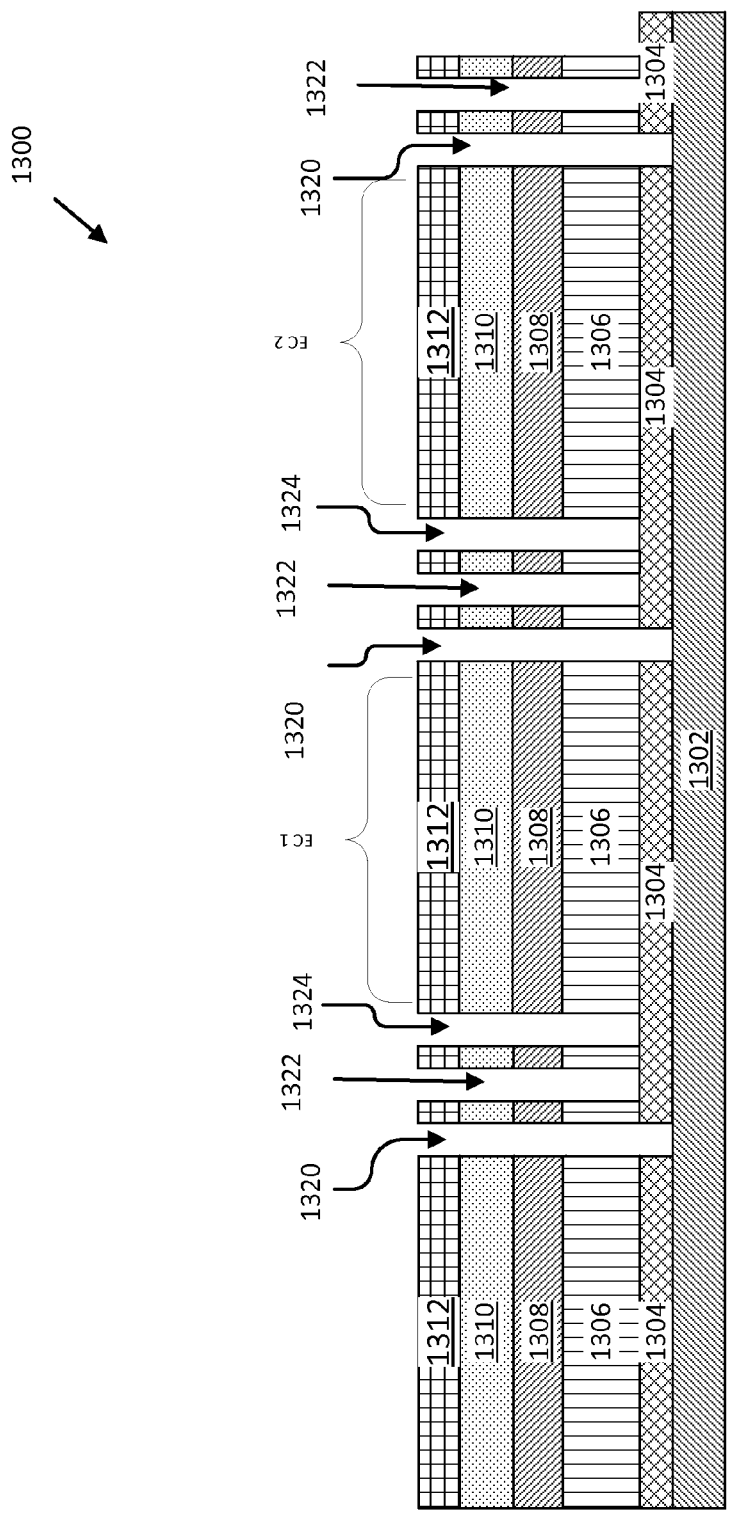
FIG. 13 illustrates an embodiment of a second step of a method for fabricating electrochromic device.
Figure 17:
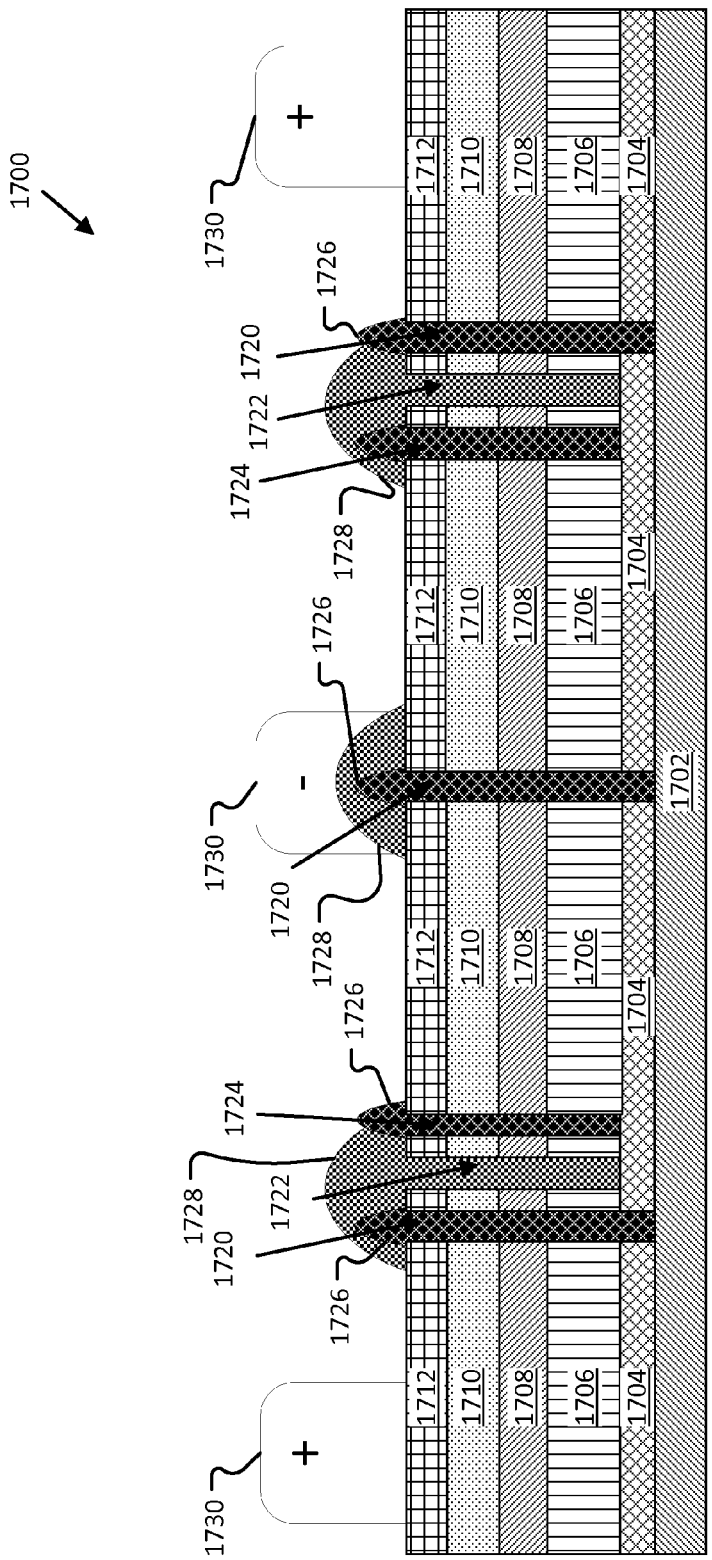
FIG. 17 illustrates an embodiment of a completed parallel connected electrochromic device.

FIG. 13 illustrates an embodiment of a second step of a method for fabricating electrochromic device 1300. In the second step of this embodiment P1 etch 1320, P2 etch 1322, and P3 etch 1324 are performed. In one embodiment the P1 etch 1320, P2 etch 1322, and P3 etch 1324 are scribed with a laser. The P1 etch 1320 is used to isolate electrochromic devices that are located next to each other on the substrate 1302. The P1 etch 1320 is scribed through all of the electrochromic device layers to the substrate 1302. At this step in the illustrated embodiment the P2 etch 1322 and P3 etch 1324 are very similar etches. Both the P2 etch 1322 and the P3 etch 1324 penetrate through all of the active electrochromic device layers except for the ion-storage layer 1306 and/or cathode contact 1604 such as but not limited to the electrochromic device 1310, anode contact 1312, electrolyte 1308, and ion-storage device 1306. It should be noted that in this embodiment of a method for fabricating electrochromic devices a series connected electrochromic devices is fabricated. In another embodiment a parallel connected electrochromic devices may be fabricated by combining a plurality of P1/P2/P3 etches 1320/1322/1324 with a subsequent P1 etch 1320 followed by a plurality of P3/P2/P1 etches 1324/1322/1320, as illustrated in FIG. 9 and FIG. 17. In an embodiment, substrate 1302, cathode contact 1304, ion-storage layer 1306, electrolyte 1308, electrochromic device 1310, anode contact 1312, P1 etch 1320, P2 etch 1322, and/or P3 etch 1324, are the same as or similar to previously described above.

Figure 14:
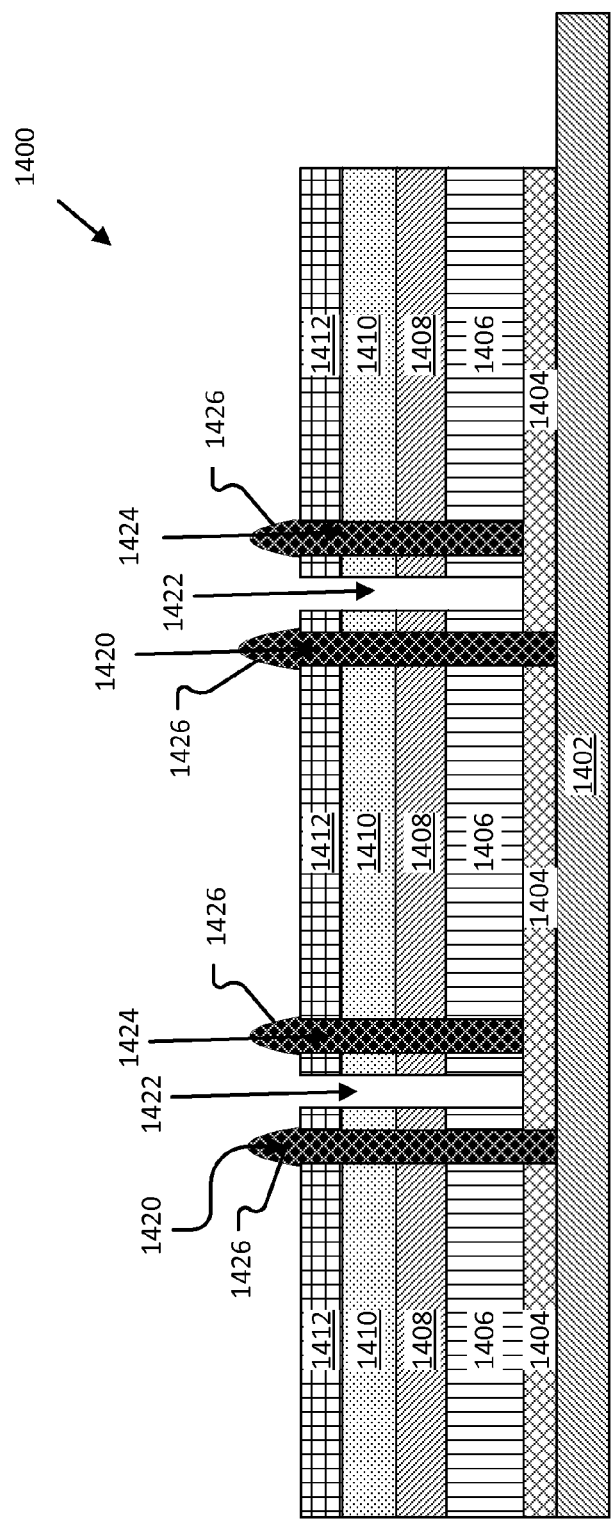
FIG. 14 illustrates an embodiment of a third step of a method for fabricating electrochromic device.

FIG. 14 illustrates an embodiment of a third step of a method for fabricating electrochromic device 1400. In the third step of this embodiment the P1 etch 1420 and P3 etch 1424 are filled. In one embodiment the P1 etch 1420 and P3 etch 1424 are filled through an inkjet fill with insulating ink 1426. In another embodiment the P1 etch 1420 and P3 etch 1424 are filled through another process with a non-conductive material. The P1 etch 1420 and P3 etch 1424 are used to electrochromic device layers across the substrate 1402 so any non-conductive material suitable for this isolation may be used. In an embodiment, substrate 1402, cathode contact 1404, ion-storage layer 1406, electrolyte 1408, electrochromic layer 1410, anode contact 1412, P1 etch 1420, P2 etch 1422, and/or P3 etch 1424, are the same as or similar to previously described above.

Figure 15:
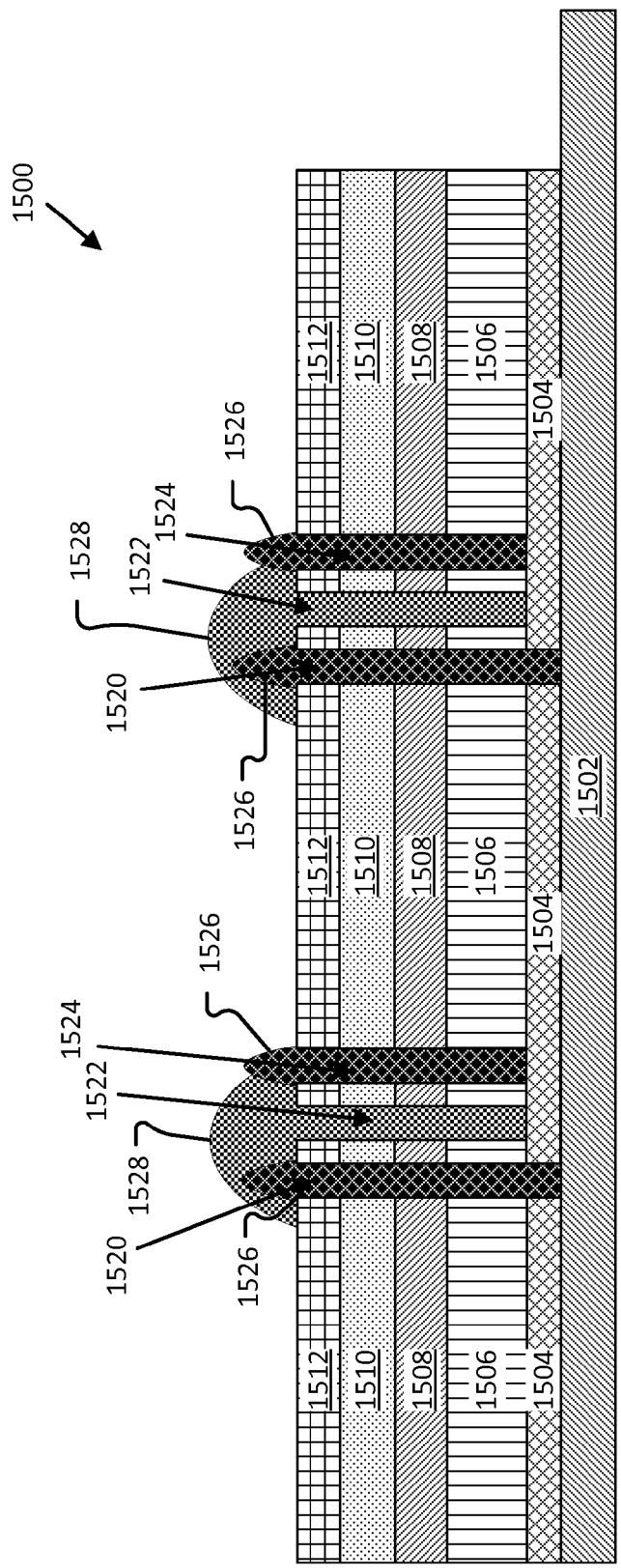
FIG. 15 illustrates an embodiment of a fourth step of a method for fabricating electrochromic device.

FIG. 15 illustrates an embodiment of a fourth step of a method for fabricating electrochromic device 1500. In the fourth step, a conductive material 1528 such as but not limited to a conductive ink is filled into the P2 etch 1522. This conductive material 1528 functions to electrically connect an electrochromic layer 1510 and/or an anode contact 1512 of one electrochromic devices with an ion-storage layer 1506 and/or cathode contact 1504 of an adjacent electrochromic device. It should be noted that the conductive material 1528 overlaps the non-conductive material 1526 in the P1 etch 1520 to contact, in this embodiment, the anode contact 1512. This creates the electrical connection between the anode contact 1512 and the adjacent cathode contact 1504. The conductive material 1528 overlaps the material 1526 in the P1 etch 1520, but not the non-conductive material 1526 in the P3 etch 1524, otherwise the conductive material 1528 in the P2 etch 1522 would short the electrochromic device. In an embodiment, substrate 1502, cathode contact 1504, ion-storage layer 1506, electrolyte 1508, electrochromic layer 1510, anode contact 1512, P1 etch 1520, P2 etch 1522, P3 etch 1524, and/or insulating ink 1826, are the same as or similar to previously described above.

Figure 16:
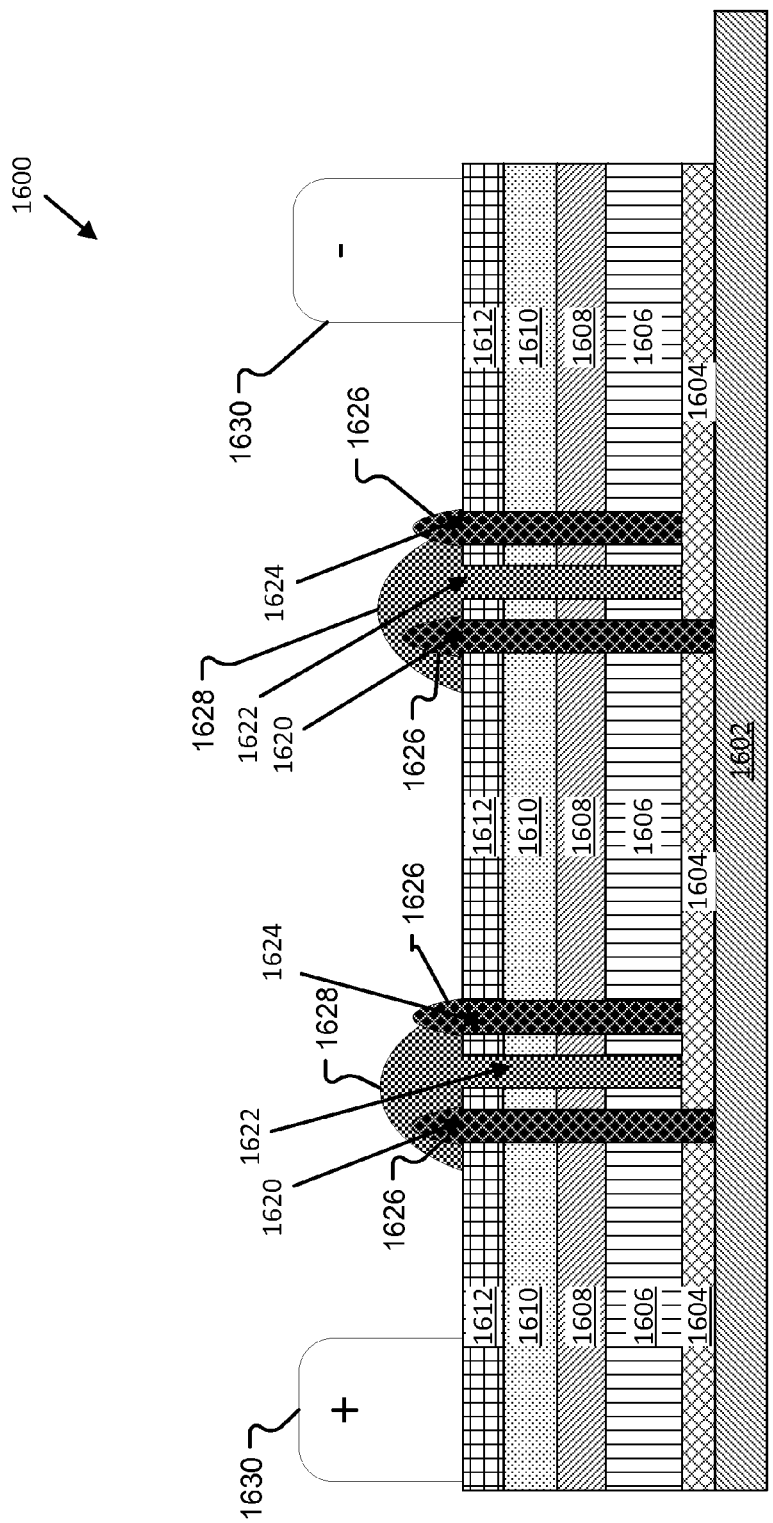
FIG. 16 illustrates an embodiment of a fifth step of a method for fabricating electrochromic device.

FIG. 16 illustrates an embodiment of a fifth step of a method for fabricating electrochromic device 1600. In the fifth step, busbars 1630 are connected to the electrochromic device in any suitable method. Busbars 1630 can be used as a point of contact for the fabricated electrochromic device. The size of the busbars 1630 can affect the maximum current that passes through the electrochromic device. Further FIG. 16 illustrates an embodiment of a completed series connected electrochromic device. In an embodiment, substrate 1602, cathode contact 1604, ion-storage level 1606, electrolyte 1608, electrochromic layer 1610, anode contact 1612, P1 etch 1620, P2 etch 1622, P3 etch 1624, insulating ink 1626, and/or conductive material 1628, are the same as or similar to previously described above.

FIG. 17 illustrates an embodiment of a completed parallel electrochromic device 1700. The completed parallel electrochromic device 1700 can be fabricated in a method similar to that shown in FIG. 12 through FIG. 16. The main difference between fabricating a series connected electrochromic device and a parallel connected electrochromic device is the order of the P1 1720, P2 1722, and/or P3 1724 etches. When fabricating a series connected electrochromic device a plurality of P1/P2/P3 etches 1720/1722/1724 are present. Alternately, when fabricating a parallel connected electrochromic device 1700 at least one set of P1/P2/P3 etches 1720/1722/1724 are present followed by a singular P1 etch 1720 followed by at least one set of P3/P2/P1 etches 1724/1722/1720. In the completed parallel connected SSLB 1700 illustrated, a non-conductive material 1726 fills the P1 1720 and P3 1724 etches while a conductive material 1728 fills the P2 etch 1722. The singular P1 etch 1720 has been filled with a non-conductive material 1726 and a conductive material 1728 has been deposited over and overlaps beyond the non-conductive fill 1726. The overlap of the conductive material 1728 covering the non-conductive fill 1726 of the singular P1 etch 1720, functions to electrically connect the anode contacts 1712 of adjacent electrochromic device. Further, busbars 1730 have been connected to the electrochromic device and can serve as a point of electrical contact. It should be noted that the electrochromic device illustrated uses three contact points, one of which is a common ground, while the other two serve as positive contacts for the parallel electrochromic device branches. In an embodiment, substrate 1702, cathode contact 1704, ion-storage device 1706, electrolyte 1708, electrochromic layer 1710, anode contact 1712, P1 etch 1720, P2 etch 1722, P3 etch 1724, insulating ink 1726, conductive material 1728, and/or busbar 1730, are the same as or similar to previously described above.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components and individual functions can be distributed among different components. In this regard, any number of the features of the different embodiments described herein may be combined into one single embodiment and alternate embodiments having fewer than or more than all of the features herein described as possible.

While various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

We claim:

1. A method of fabricating an electrochromic device comprising:
   depositing a plurality of first electrochromic device layers on a first side of a substrate;
   depositing a plurality of second electrochromic device layers on a second side of the substrate;
   connecting a first one of the first electrochromic device layers with a first one of the second electrochromic device layers; and
   connecting a second one of the first electrochromic device layers with a second one of the second electrochromic device layers.

2. The method of claim 1, wherein both the plurality of first electrochromic device layers and the plurality of second electrochromic device layers comprise at least one of a cathode contact, an ion-storage layer, an electrolyte, an electrochromic layer, and an anode contact.

3. The method of claim 1, wherein both the first one of the first electrochromic device layers and the first one of the second electrochromic device layers comprise one of a cathode contact and a ion-storage layer.

4. The method of claim 1, wherein both the second one of the first electrochromic device layers and the second one of the second electrochromic device layers comprise one of an anode contact and an electrochromic layer.

5. The method of claim 1, wherein connecting comprises one of soldering, wire-bonding, etching at least one via through the substrate, and drilling at least one via through the substrate.

6. A method of creating an electrochromic device comprising:
   depositing a plurality of first electrochromic device layers on a first side of a substrate;
   depositing a plurality of second electrochromic device layers on a second side of the substrate; and
   connecting a first one of the first electrochromic device layers with a second one of the second electrochromic device layers.

7. The method of claim 6, wherein both the plurality of first electrochromic device layers and the plurality of second electrochromic device layers comprise at least one of a cathode contact, an ion-storage layer, an electrolyte, an electrochromic layer, and an anode contact.

8. The method of claim 6, wherein the first one of the first electrochromic device layers comprises one of a cathode contact and an ion-storage layer.

9. The method of claim 6, wherein the second one of the second electrochromic device layers comprises one of an electrochromic device and an anode contact.

10. The method of claim 6, wherein connecting comprises one of soldering, wire-bonding, etching at least one via through the substrate, and drilling at least one via through the substrate.

11. A electrochromic device comprising:
    a substrate with at least a first side and a second side;
    a first ion-storage layer deposited on the first side of the substrate;
    a first electrolyte deposited on the first ion-storage layer;
    a first electrochromic layer deposited on the first electrolyte;
    a second ion-storage layer deposited on the second side of the substrate;
    a second electrolyte deposited on the second ion-storage layer; and
    a second electrochromic layer deposited on the second electrolyte, wherein
    at least one of the first ion-storage layer and the first electrochromic layer is in electrical contact with at least one of the second ion-storage layer and the second electrochromic layer.

12. The device of claim 11, wherein the substrate is PET.

13. The device of claim 11, wherein at least one of the first ion-storage layer and the second ion-storage layer further includes a cathode contact.

14. The device of claim 11, wherein at least one of the first ion-storage layer and the second ion-storage layer comprises lithium vanadium oxide.

15. The device of claim 11, wherein at least one of the first electrochromic layer and the second electrochromic layer further includes an anode contact.

16. The device of claim 11, wherein at least one of the first electrochromic layer and the second electrochromic layer comprises tungsten oxide.

17. The device of claim 11, wherein at least one of the first electrolyte and the second electrolyte comprises LiPON.

18. The device of claim 11, wherein the substrate is glass.

19. The device of claim 11, wherein the first electrolyte is a non-conductive paste.

20. The device of claim 11, wherein the second electrolyte is a polymer.

* * * * *